(12) United States Patent
Aftanas

(10) Patent No.: US 7,802,707 B2
(45) Date of Patent: Sep. 28, 2010

(54) VEHICLE ARTICLE CARRIER APPARATUS HAVING SINGLE SIDED RELEASE AND METHOD THEREFOR

(75) Inventor: Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 664 days.

(21) Appl. No.: 11/746,854

(22) Filed: May 10, 2007

(65) Prior Publication Data

US 2008/0277438 A1 Nov. 13, 2008

(51) Int. Cl.
 B60R 9/00 (2006.01)
 B60R 9/045 (2006.01)
 B61D 45/00 (2006.01)

(52) U.S. Cl. .................. 224/321; 224/315; 224/320; 224/325; 224/326; 410/104; 410/105; 410/106

(58) Field of Classification Search .............. 224/311, 224/321, 323, 315, 326, 331, 309, 320, 322, 224/325, 329; 410/104, 105, 106
See application file for complete search history.

(56) References Cited

U.S. PATENT DOCUMENTS

| | | |
|---|---|---|
| 5,715,980 A | 2/1998 | Blankenburg et al. |
| 5,752,637 A | 5/1998 | Blankenburg |
| 5,833,103 A | 11/1998 | Rak |
| 5,924,614 A * | 7/1999 | Kuntze et al. ............... 224/321 |
| 6,068,169 A | 5/2000 | Aftanas |
| 6,112,964 A | 9/2000 | Cucheran et al. |
| 6,131,782 A * | 10/2000 | De Silva et al. ............ 224/321 |
| 6,779,696 B2 | 8/2004 | Aftanas et al. |
| 7,044,345 B2 | 5/2006 | Aftanas |
| 7,198,184 B2 * | 4/2007 | Aftanas et al. ............. 224/309 |
| 7,441,679 B1 * | 10/2008 | Harberts et al. ............ 224/321 |

\* cited by examiner

Primary Examiner—Nathan J Newhouse
Assistant Examiner—Lester L Vanterpool
(74) Attorney, Agent, or Firm—Harness, Dickey & Pierce, P.L.C.

(57) ABSTRACT

A vehicle article carrier apparatus and method incorporating a single side releasable crossbar assembly. In one embodiment the crossbar assembly includes a pair of end supports that each includes an actuating member. In one embodiment the actuating member is formed by a pivotally mounted actuating lever. In another embodiment the actuating member is formed by a rotationally mounted, trigger style actuating member. In either embodiment, the actuating member is movable between locked and unlocked positions. Each end support also includes a locking pin having a pivot wheel carried thereon. A cable is entrained around the pulley wheel of each locking pin, and the ends of the cable are coupled to the actuating members. Either actuating member can be used to simultaneously lock and unlock the locking pins of both end supports from a pair of support rails on which the cross bar assembly is supported.

20 Claims, 14 Drawing Sheets

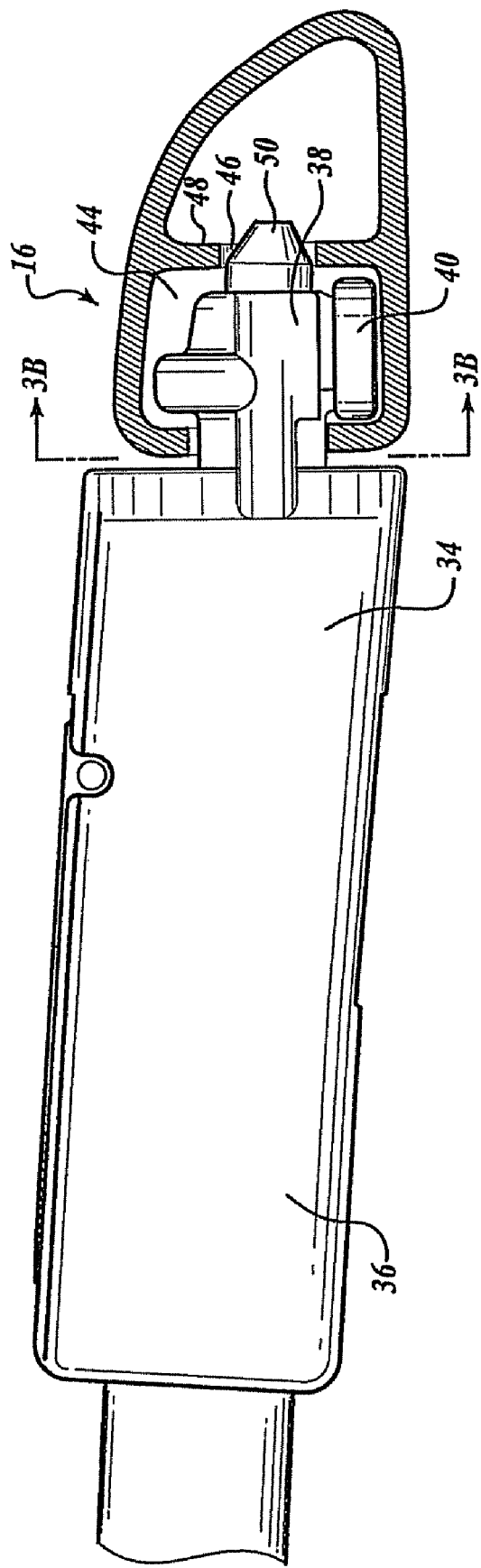
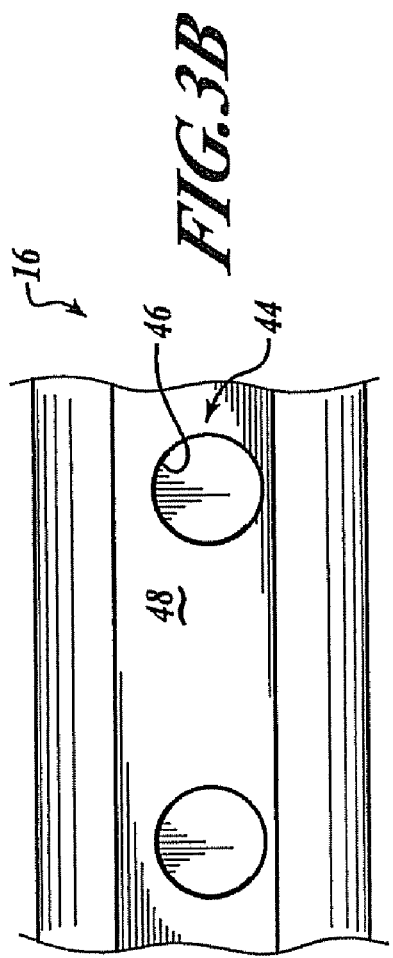

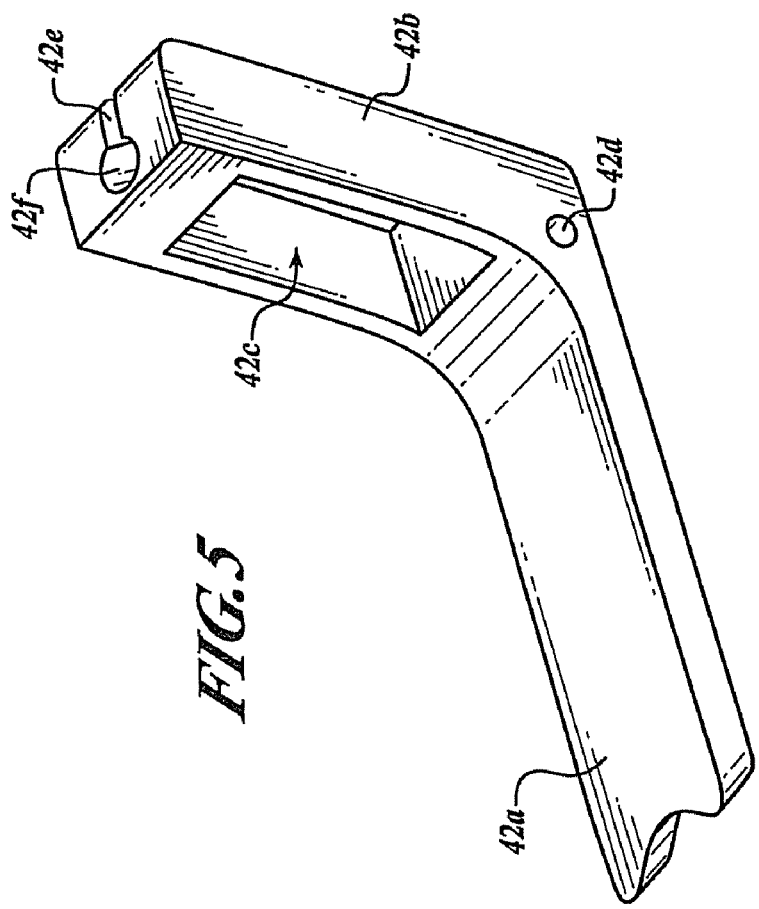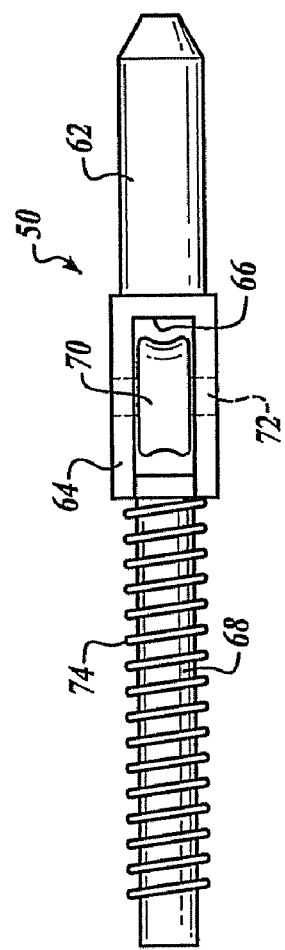

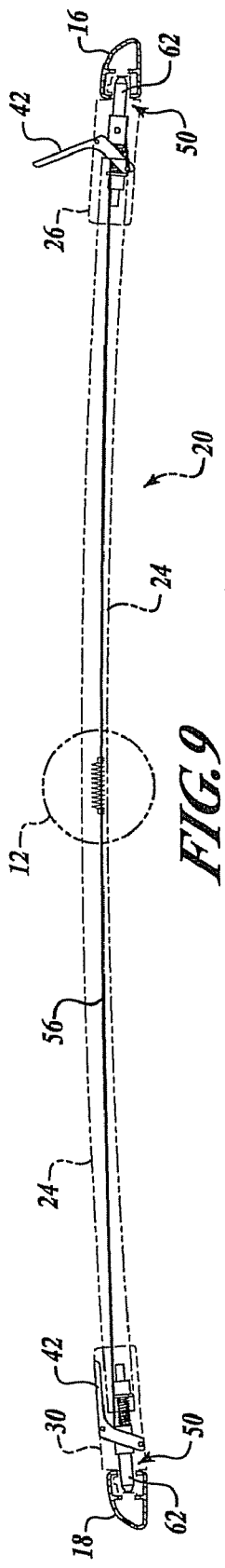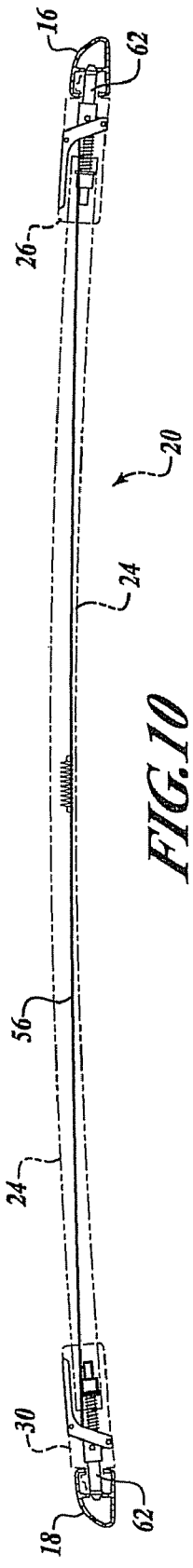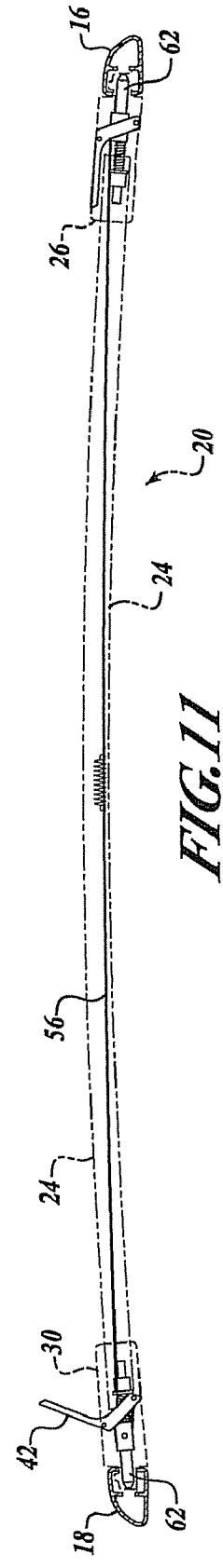

VEHICLE ARTICLE CARRIER APPARATUS HAVING SINGLE SIDED RELEASE AND METHOD THEREFOR

FIELD

The present disclosure relates to vehicle article carriers, and more particularly to a vehicle article carrier system that makes use of at least one cross bar assembly having a single side release feature.

BACKGROUND

Vehicle article carriers are used in a wide variety of applications with various types of motor vehicles. Typically the vehicle article carrier is disposed on the roof portion of a vehicle, or possibly on the sidewalls of a bed of a pickup truck such that it is disposed over the bed. In many instances the typical vehicle article carrier will include a pair of crossbars that are each supported at their opposite ends from corresponding support rails. Each support rail is typically fixedly secured to an outer body surface of the vehicle. In many instances one or both of the crossbars may be adjustable; that is, one or both of the crossbars may be moveable along the support rails and locked at one of a plurality of positions along the lengths of the support rails to enhance the utility of the crossbars in supporting variously sized and shaped articles being carried on the crossbars.

When repositioning either of the crossbars, typically the user must release some form of locking or latching arrangement at each end of the crossbar. This requires the user to first unlock an end support at one end of the cross bar, then walk to the other side of the vehicle and perform the same operation at the other end support. The crossbar may then be moved along the support rails to the desired position. The user then locks one end of the cross bar to its associated support rail, and then walks around to the other side of the vehicle to lock the other end support. Accordingly, the simple act of repositioning a crossbar can be somewhat cumbersome for the user. If the user uses his/her vehicle article carrier system frequently to transport articles of widely varying sizes and shapes, then the above-described unlocking and locking action must be performed each time the crossbars are repositioned.

Previous attempts at providing a vehicle article carrier having a single side release feature associated with each cross bar of the carrier have often required the use of complex locking mechanisms. Such mechanisms have often been relatively costly to implement and/or have required complex assembly operations.

It would therefore be desirable to provide a vehicle article carrier system that enables both ends of a cross bar of the system to be locked or unlocked from a single side of the cross bar. It would be even further desirable to enable the locking and unlocking action to be performed at either end of the cross bar. Still further, it would be desirable to provide a cross bar having a single side release feature that is of relatively inexpensive yet robust construction.

SUMMARY

The present disclosure relates to a vehicle article carrier apparatus and method that incorporates a single side locking and release construction. In one embodiment the apparatus includes a pair of support rails that are adapted to be fixedly secured to an outer body surface of the vehicle generally parallel to one another. The support rails each include at least one opening formed therein, and more preferably a plurality of spaced apart openings. At least one cross bar, and more preferably a pair of cross bars, are supported at opposite ends from the support rails so as to be positioned above the outer body surface.

At least a first one of the cross bars includes a cross bar component having an end support at each end thereof. The end supports each include an actuating member operably associated with a locking element. The locking elements and actuating members of both end supports are operably associated with one another by an elongated member that extends along the cross bar component. Each of the locking pins is positioned adjacent an associated biasing element. The biasing elements urge the locking pins into extended positions so that they engage with a selected pair of the holes in the side rails to thus enable both of the end supports to be locked at a desired position along the support rails.

Each actuating member can be moved between a locked position and an unlocked position, and movement of either actuating member causes a corresponding movement of the other actuating member at the other end support. Thus, movement of either actuating member into its unlocked position causes both of the locking elements to be retracted from their respective holes in the support rails. While the actuating member is in its unlocked position, the entire cross bar can be moved along the support rails and repositioned at a different position such that the locking elements are aligned with a different pair holes in the support rails. Moving the actuating member into its locked position enables the biasing springs at both end supports to urge both of the locking elements into holes in the support rail. Thus, both the unlocking and locking action at both end supports can be accomplished by a user from one side of the cross bar. Advantageously, the locking and unlocking action can be accomplished from either end support.

In one specific embodiment the actuating members each comprise a trigger style actuating member that is mounted for rotational movement within a plane generally parallel to the outer body surface of the vehicle. Opposite ends of the elongated element are coupled to the actuating members. Each locking element also includes a pulley wheel around which a portion of the cable is entrained. Rotational movement of either one of the trigger style actuating members causes the effective length of the cable to be reduced. The pulley wheels at each locking element enable both locking elements to be linearly withdrawn into retracted positions when either of the actuating members is moved into its unlocked position, so that the entire cross bar can be moved along the support rails and repositioned. The biasing members enable both of the locking elements to be biased into extended (i.e., locked) positions relative to the support rails when the user releases the actuating member. Thus, the locking and unlocking action is accomplished virtually simultaneously at both end supports by controlling either one of the actuating members.

In another specific embodiment the actuating members are formed by pivotally mounted actuating levers. Each end of the elongated element is secured to a free end of a respective one of the actuating levers. Pivotal movement of either of the actuating levers by the user into an unlocked position causes both of the locking elements to be retracted virtually simultaneously. Biasing elements operably associated with the locking elements enable both of the locking elements to be urged automatically into extended (i.e., locked) positions when the user releases the actuating member.

In another embodiment each support rail includes a channel formed along a substantial portion of the length thereof. Each end support includes at least one, and more preferably a pair, of support feet that engage within the channel of its respective support rail. Each pair of support feet support its associated end support from a respective one of the support rails and prevents the end support from being removed from the support rails. In one specific embodiment each support foot includes a rotationally mounted wheel. The wheels enable each end support to be moved even more smoothly along the support rails when the cross bar is being repositioned.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is an end cross sectional view illustrating the end support of FIG. 2 installed on its associated end support, taken in accordance with section line 3A-3A in FIG. 1;

FIG. 3B is a cross sectional view taken in accordance with section line 3B-3B in FIG. 3A illustrating the spaced apart holes formed in an interior wall of the channel of one of the support rails;

FIG. 5 is an enlarged bottom perspective view of the first actuating lever shown in FIG. 4;

FIG. 6 is an enlarged side view of the assembled locking pin, coil spring and retainer component;

FIG. 9 is a simplified side view of the first cross bar assembly of FIG. 1 illustrating the first end support having its actuating lever moved into the unlocked position, and both locking pins of the end supports having been retracted into unlocked positions relative to their support rails;

FIG. 10 shows the cross bar assembly of FIG. 9 but with both actuating levers positioned in their locked positions, which causes both of the locking pins to be moved into their extended (locked) positions;

FIG. 11 shows the cross bar assembly of FIG. 9 but with the actuating lever of the second end support moved into its unlocked position, thus causing both of the locking pins to be retracted into their unlocked positions;

DETAILED DESCRIPTION

Figure 1:
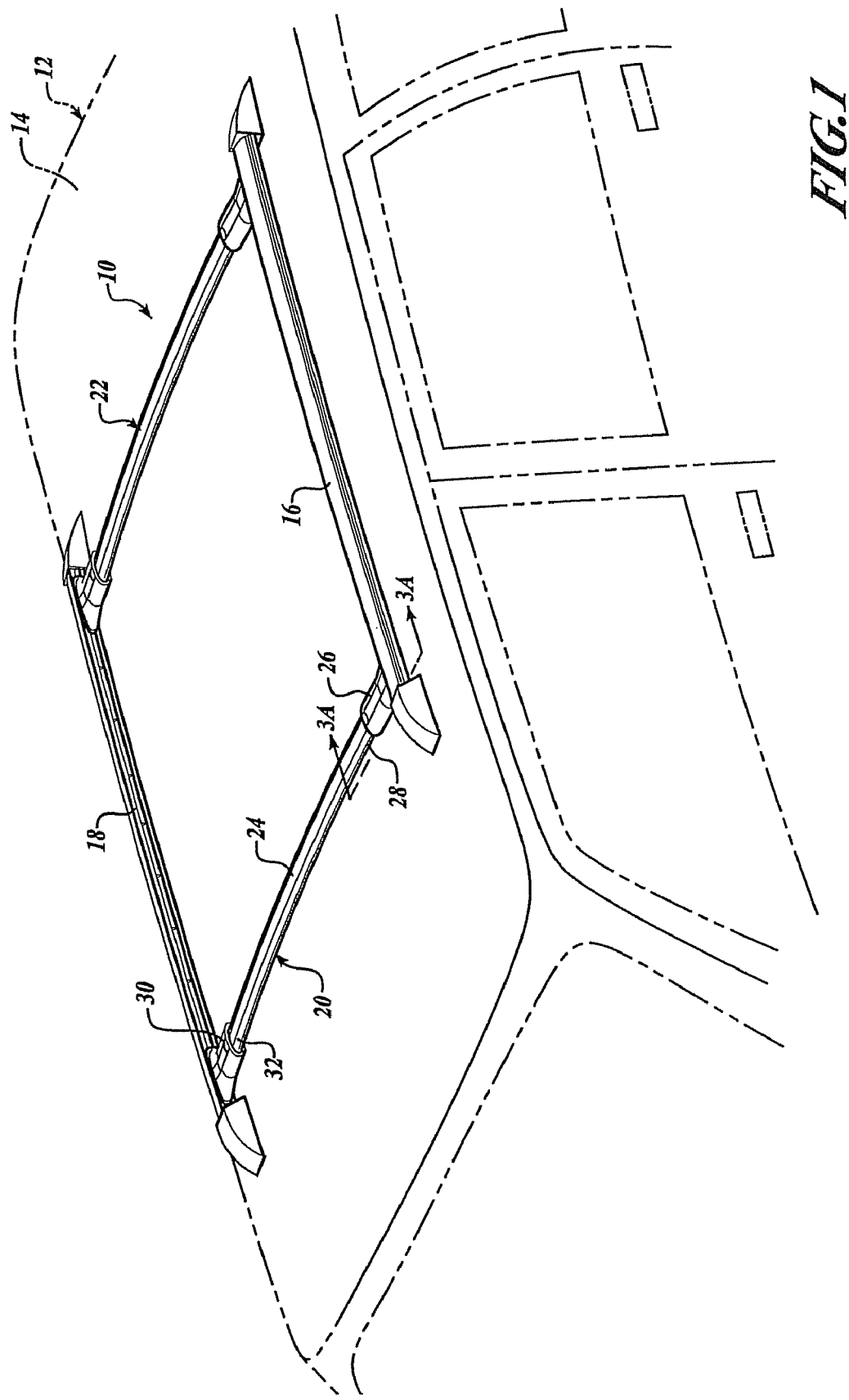
FIG. 1 is a perspective view of one embodiment of a vehicle article carrier of the present disclosure supported on an outer body surface roof surface of a motor vehicle.

Referring to FIG. 1, there is shown a vehicle article carrier apparatus 10 in accordance with one embodiment of the present disclosure, mounted on an outer body surface 14 of a motor vehicle 12. In this example the motor vehicle 12 is illustrated as a sport utility vehicle (SUV). However, it will be appreciated that the apparatus 10 can be employed on the outer body surface of virtually any form of motor vehicle such as a station wagon, sedan, van, and even over the bed of a pick-up truck. Thus, it will be appreciated that apparatus 10 is not limited to use with only one specific type of vehicle.

The apparatus 10 generally includes a first support rail 16 and a second support rail 18 that are fixedly secured to the outer body surface 14 generally parallel to one another. A first crossbar assembly 20 and a second crossbar assembly 22 are both supported on the support rails 16 and 18 so that they rest above the outer body surface 14. The crossbar assemblies 20 and 22 in this example are identical in construction and are each adjustably positionable along the support rails 16 and 18 to enable the crossbar assemblies to be positioned to best support articles of varying sizes and shapes thereon. It will be appreciated, however, that while both of the crossbar assemblies 20 and 22 are able to be adjustably positioned, that instead one of the crossbar assemblies 20 or 22 could be fixedly secured to the support rails 16 and 18 so as to be non-movable. Since the crossbar assemblies 20 and 22 in this example are identical in construction, a detailed description of the construction of only first crossbar assembly 20 will be provided.

Figure 2:
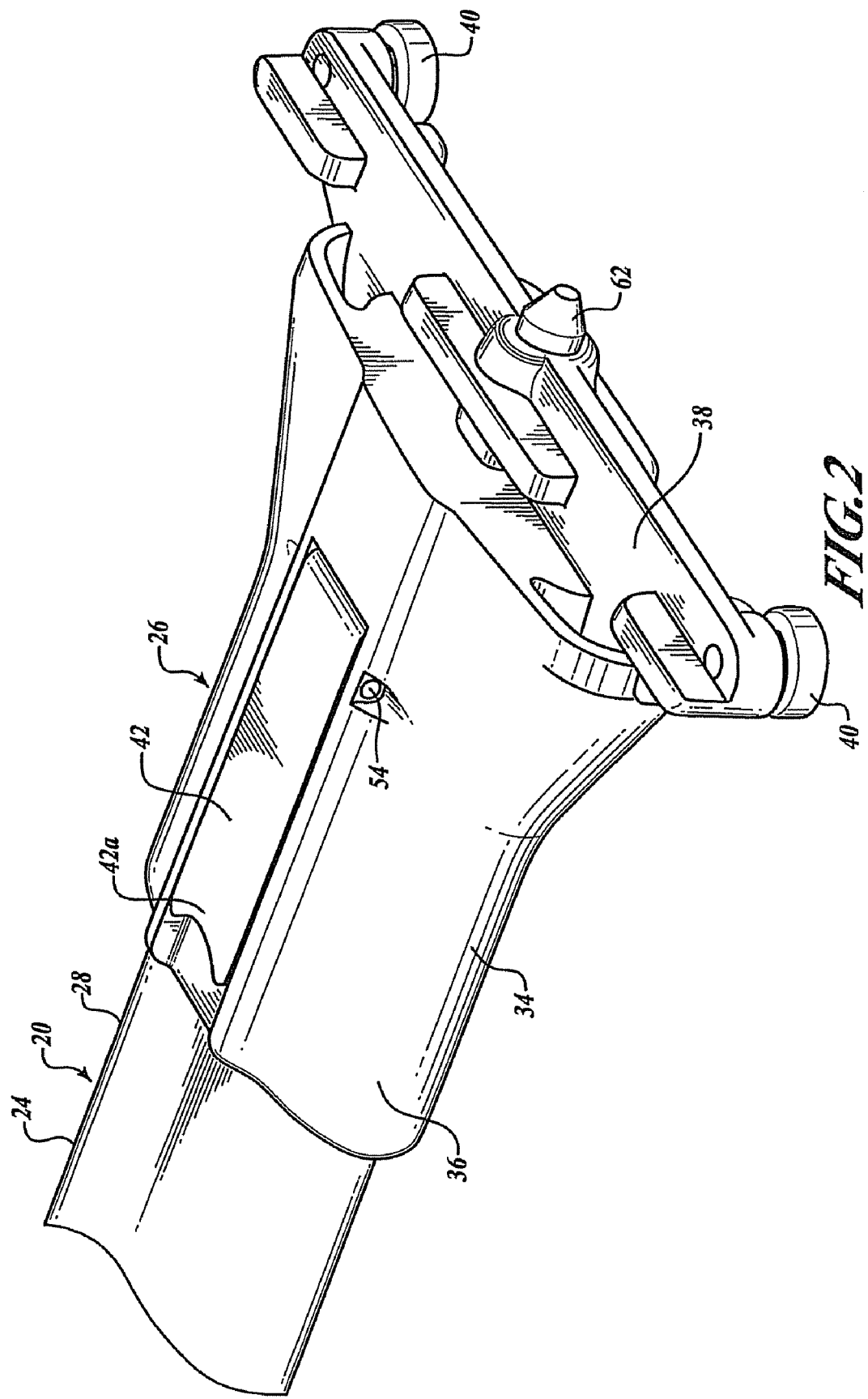
FIG. 2; is an enlarged perspective view of one end support of one of the cross bar assemblies shown in FIG. 1.

With reference to FIGS. 1 and 2, the first crossbar assembly 20 includes a tubular crossbar component 24, a first end support 26 disposed at a first end 28 of the crossbar component 24, and a second end support 30 disposed at a second end 32 of the crossbar component 24. The end supports 26 and 30, in this example, are identical in construction.

Referring specifically to FIG. 2, the end support 26 includes a housing 34 having a neck portion 36. A support foot 38 is integrally formed with the housing 34 and adapted to extend within a portion of the support rail 16, as will be described in greater detail in the following paragraphs. The support foot 38 preferably includes a pair of rotationally mounted wheels 40 that permit smooth movement on the end support 26 along the support rail 16. An actuating member in the form of an actuating lever 42 is pivotally mounted within the housing 34. The actuating lever 42 is movable between a retracted position, as shown in FIG. 2, and an unlocked position, as will be described in greater detail in the following paragraphs.

With reference to FIGS. 3A and 3B, the support rail 16 is shown in greater detail. The support rail 16 is identical in construction to support rail 18, and may be extruded from aluminum or another suitably high strength material (e.g., other metals or possibly high strength plastics) having good corrosion resistance. The support rail 16 roll includes a channel 44 for receiving the support foot 38. The channel 44 has dimensions that permit the wheels 40 to be captured therein with only a small degree of play. In this manner, the wheels 40 may be rolled along the channel 44 when the crossbar assembly 20 is being repositioned along the support rails 16 and 18. The wheels 40 help to prevent binding or "crabbing" of the support foot 38 as it is moved within the channel 44.

With further reference to FIGS. 3A and 3B, the support rail 16 includes at least one hole 46 formed in an interior wall 48 within the channel 44 of the support rail 16. As indicated in FIG. 3A, preferably a plurality of spaced apart holes 46 are formed that each define a specific position at which the first end support 26 may be fixedly secured relative to the support rail 16. The first end support 26 includes a locking pin 50 that engages within one of the holes 46 to fixedly secure the first end support 26 at a specific position along the length of the support rail 16. In this regard it will be appreciated that since the support rails 16 and 18 are identical in construction, that specific pairs of the holes 46 will be laterally aligned with one another when the support rails 16 and 18 are fixedly secured to the outer body surface 14 of the vehicle 12. Thus, the corresponding pairs of longitudinally aligned holes 46 will define a plurality of specific locations along the lengths of the support rails 16 and 18 at which the first and second cross bar assemblies 20 and 22 may be secured.

Figure 4:
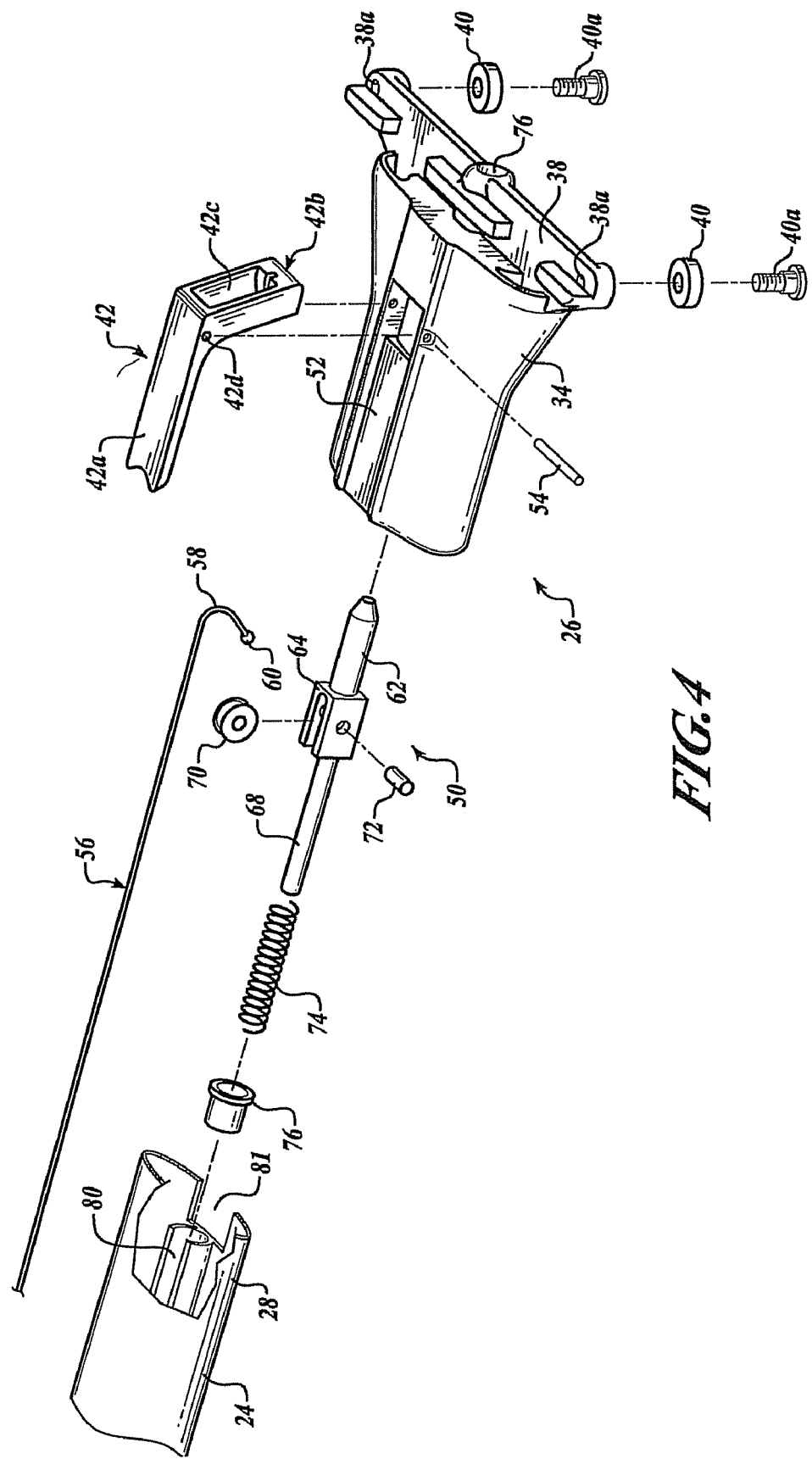
FIG. 4 is an exploded perspective view of the end support of FIG. 2.

With reference to FIG. 4, construction of the first end support 26 can be seen in greater detail. The first end support 26 includes a recess 52 formed in the housing 34. The actuating lever 42 includes a manually engageable portion 42a that rests within the recess 52 such that the actuating lever 42 is essentially flush with an outer surface of the housing 34 when the actuating lever 42 is in its locked (i.e., retracted) position.

Referring further to FIGS. 4 and 5, the actuating lever 42 includes a base portion 42b having an opening 42c and a hole 42d. Hole 42d receives a pin 54 (FIG. 4) that pivotally secures the actuating lever 42 to the housing 34. The pin 54 extends through aligned holes 54a in the housing 34. The actuating lever 42 also includes a notched portion 42e within an enlarged opening 42f. The cable 56 has an enlarged head portion 60 at an end 58 thereof that fits within the enlarged opening 42f so that the end 58 is secured to actuating lever 42. The opposite end of the cable 56 is identical in construction to that described above for end 58 of the cable.

With further reference to FIGS. 4 and 6, the locking pin 50 includes a head portion 62, a mid-portion 64 having an opening 66, and a base portion 68. Within the opening 66 is positioned a pulley wheel 70 that is secured within the mid-portion 64 by a pin 72 which is indicated in dashed lines in FIG. 6. A coil spring 74 is adapted to be positioned over the base portion 68. A retaining sleeve 76 fits loosely over the base portion 68 to retain the coil spring 74, as will be described in greater detail in the following paragraphs. The end 58 of the cable 56 is entrained around the pulley wheel 70 and extends through the opening 66 in the locking pin 50, engaging in the slot 42e of the actuating lever 42.

Figure 7:
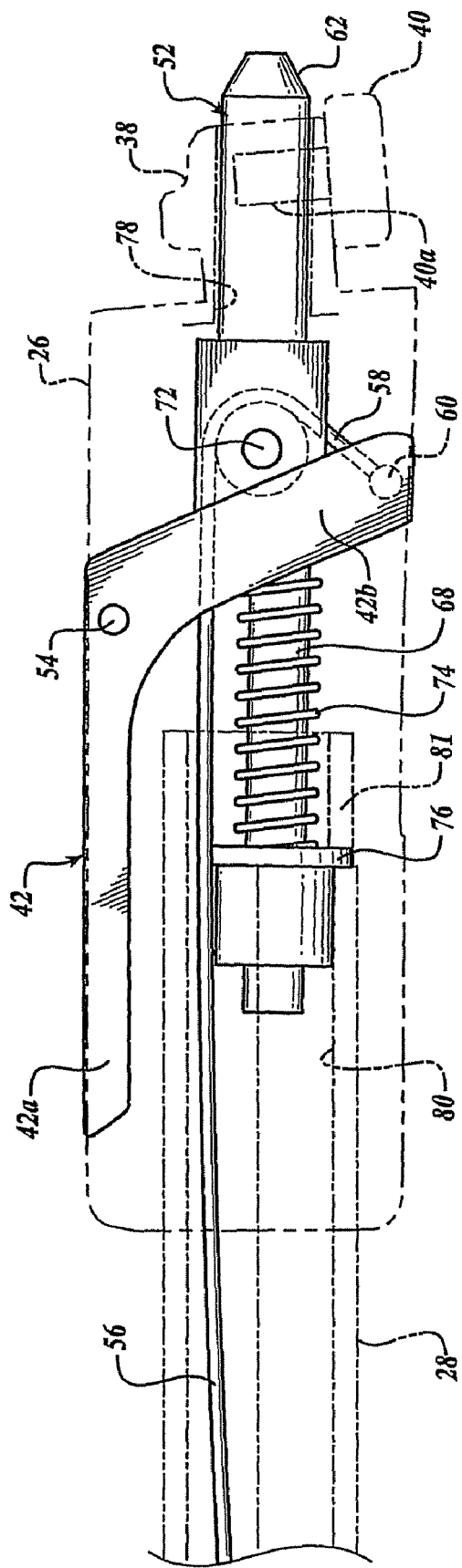
FIG. 7 is an enlarged side view of the first end support of FIG. 2 with the actuating lever in its locked position, causing the locking pin to assume an extended (i.e., locked) position, and with the housing of the end support and the cross bar component shown in phantom.
Figure 8:
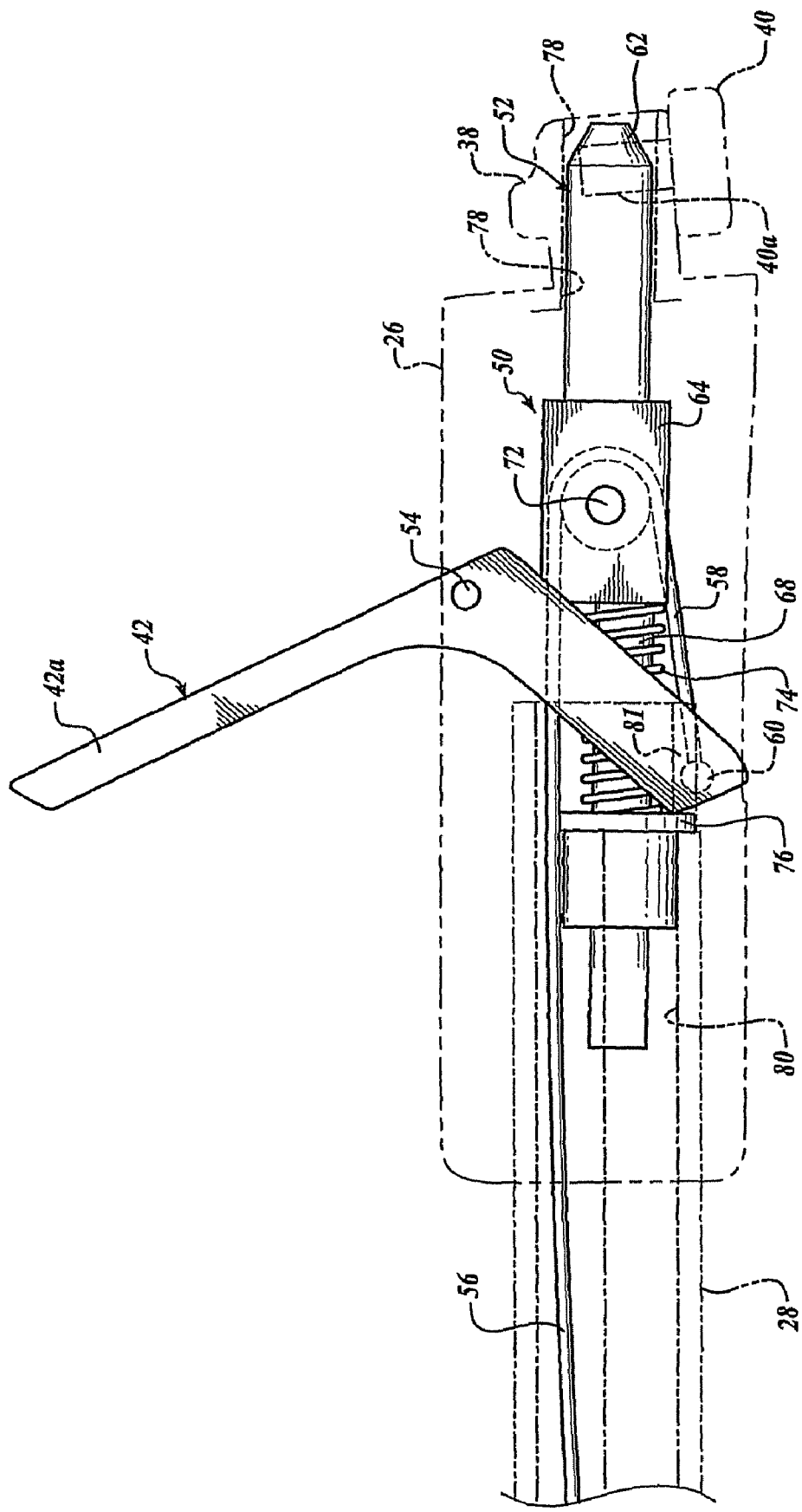
FIG. 8 is a view of the first end support of FIG. 7 but with the actuating lever shown in its unlocked position, which causes the locking pin to be retracted.

Referring to FIGS. 7 and 8, the mounting of the locking pin 50 and the actuating lever 42 within the housing 34 of the first end support 26 can be seen in further detail. The head portion 62 of the locking pin 50 is captured within a bore 78 of the foot portion 38. The retaining sleeve 76 is positioned within an interior channel 80 adjacent a notch 81 at the end 28 of the crossbar component 24. This enables the entire locking pin 50 to move slideably left and right in FIGS. 7 and 8 through the opening 42c in the actuating lever 42 as the actuating lever is moved from its locked position, shown in FIG. 7, into its unlocked position shown in FIG. 8. The interior channel 80 enables the retaining sleeve 76 to be held securely, while providing room for the base portion 68 of the locking pin 50 to move as the actuating lever 42 is moved. The opening 42c also permits the cable end 58 to move freely without interference from the actuating lever 42. Accordingly, this enables an extremely, compact, space efficient arrangement to be formed within the first end support 26.

In the locked position of FIG. 7, the head portion 62 of the locking pin 50 extends within one of the holes 46 in the support rail 16. In the unlocked position of FIG. 8, the head portion 62 is retracted linearly within the end support housing 34 and out of engagement with the hole 46.

Figure 12:
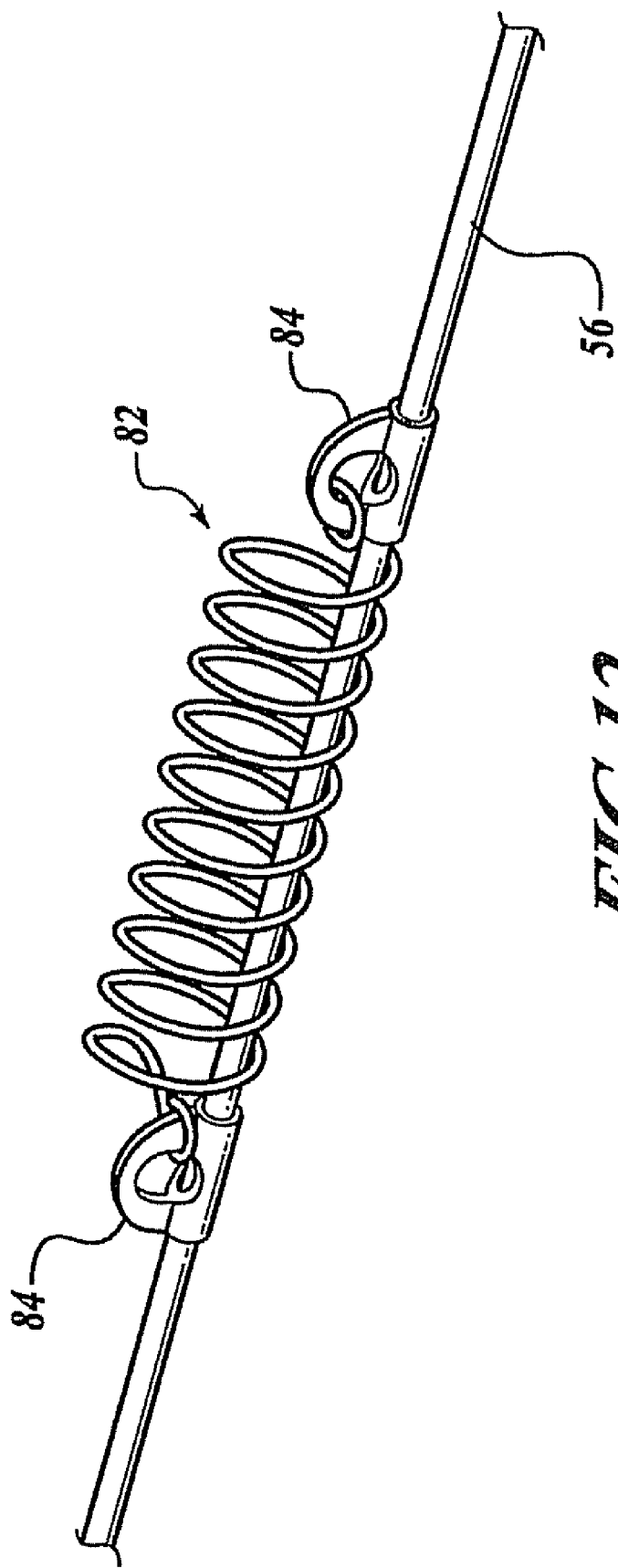
FIG. 12 is an enlarged perspective view of the circled area in FIG. 9 illustrating the coil spring coupled to the cable at a midpoint of the cable length to take up any slack in the cable.

Referring to FIGS. 9 and 12, at an approximate midpoint of the cable 56, a coil spring 82 is secured via a pair of clips 84 to the cable 56. The coil spring 82 provides a small degree of additional tension that takes up any slack in the cable 56.

Referring now to FIGS. 9-11, the operation of the first cross bar assembly 20 will be described. Referring first to FIG. 9, when the actuating lever 42 at end support 26 is moved into the unlocked position, this effectively shortens the overall length of the cable 56. This in turn causes the head portion 62 of each locking pin 50 at both end supports 26 and 30 to be generally simultaneously withdrawn from their respective holes 46 in the support rails 16 and 18.

In FIG. 10, when the actuating lever 42 of end support 26 is moved into its locked position, this effectively lengthens the cable 56. This enables the coil spring 74 in each end support 26 and 30 to generally simultaneously bias its associated locking pin 50 into the locked position relative to its respective support rail (16 or 18).

In FIG. 11, when the actuating lever 42 of the second end support 30 is lifted into its unlocked position, the same action as described for FIG. 9 occurs. That is, the cable 56 is effectively shortened and both of the locking pins 50 are generally simultaneously withdrawn from the holes 46 in their respective support rails 16 and 18.

Figure 13:
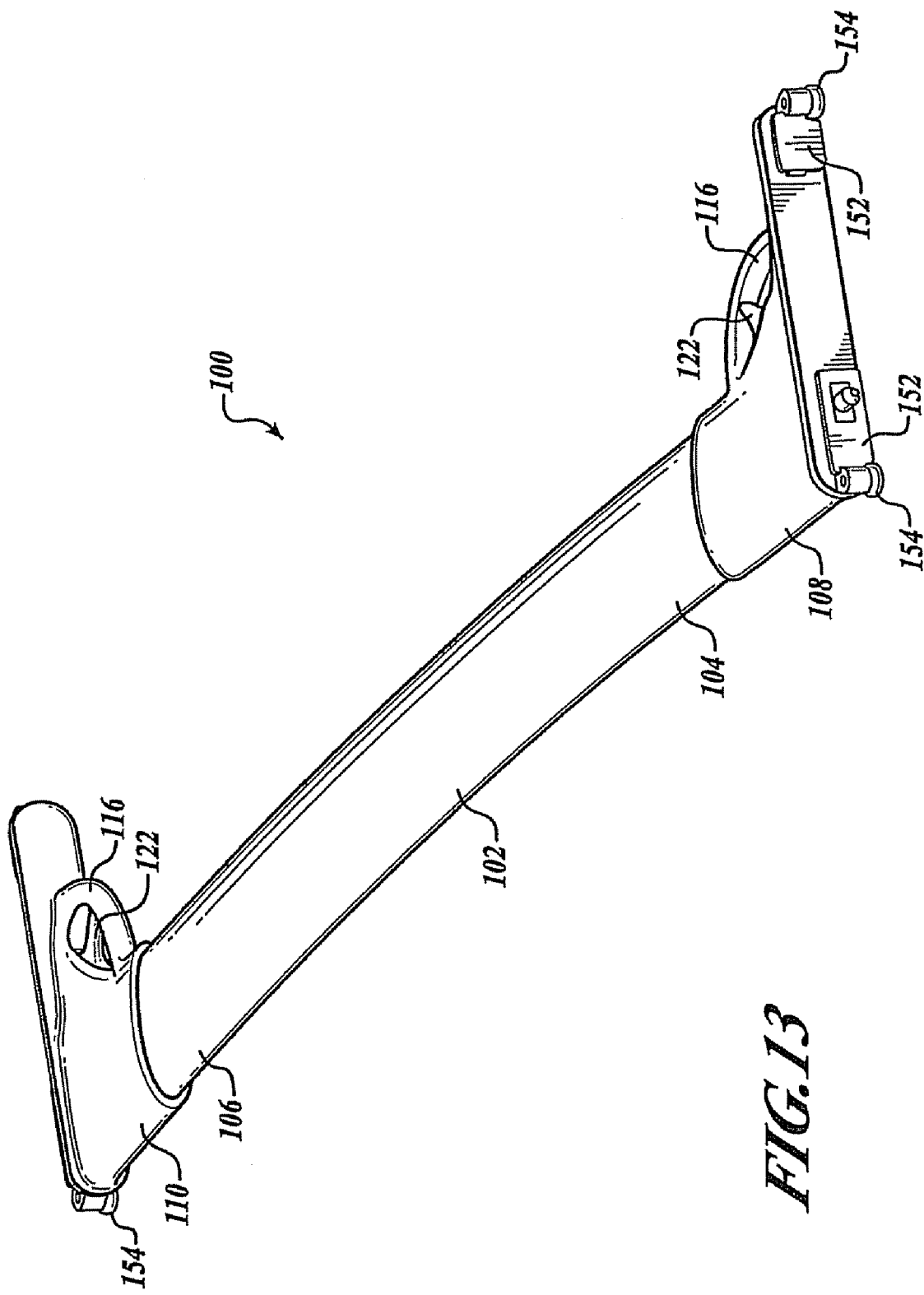
FIG. 13 is a perspective view of another cross bar assembly that may be used with the support rails shown in FIG. 1.

Referring now to FIG. 13, another crossbar assembly 100 for use with the support rails 16 and 18 of FIG. 1 is illustrated. Crossbar assembly 100 may be used in place of either crossbar assembly 20 or assembly 22, or a pair of the crossbar assemblies 100 may be substituted for the crossbar assemblies 20 and 22 in FIG. 1. As will be explained further in the following paragraphs, crossbar assembly 100 also forms a single side release crossbar assembly that can be unlocked and locked from either end support thereof.

In FIG. 13, the crossbar assembly 100 includes a crossbar component 102 having opposite ends 104 and 106. A first end support 108 is secured to the end 104, and a second end support 110 is secured to the end 106. End supports 108 and 110 are identical in construction.

Figure 14A:
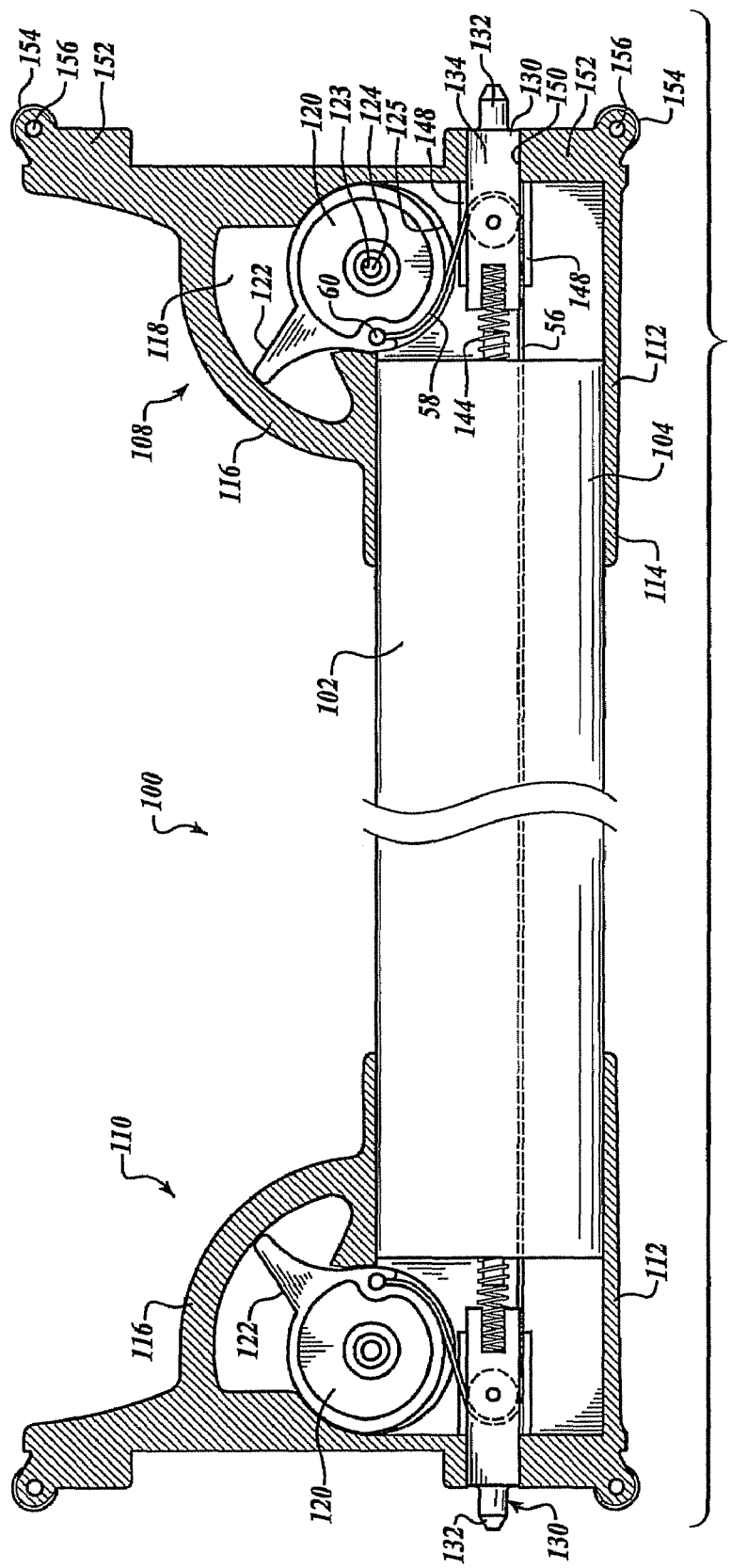
FIG. 14A is bottom plan view of the cross bar of FIG. 13 with portions of the housings of both end supports broken away to better illustrate the internal components of each end support.

Referring to FIG. 14A, the crossbar assembly 100 is shown in greater detail. Since the end supports 108 and 110 are identical in construction, the same reference numerals have been used to identify common components of the end supports 108 and 110. For convenience however, the following description will refer to the construction of the first end support 108.

The first end support 108 includes a housing 112 having a neck portion 114 for receiving a portion of the end 104 of the crossbar component 102. The housing 112 includes a trigger guard portion 116 defining an opening 118. A trigger style actuating member 120 is positioned within a plane generally parallel to the outer body surface 14 when the cross bar assembly 100 is secured to the support rails 16 and 18. The trigger style actuating member 120 has a trigger portion 122 extends within the opening 118 and is manually engageable with one or more fingers of a user's hand.

Figure 14B:
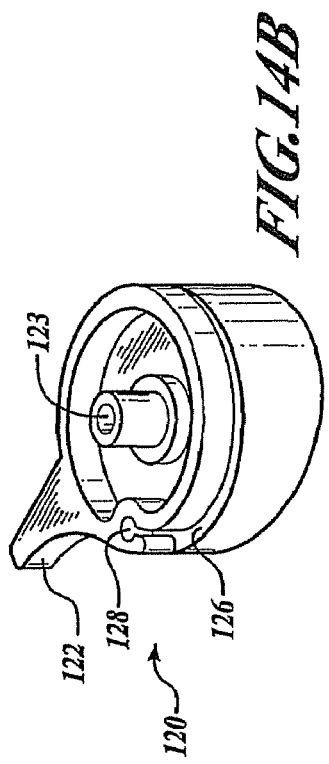
FIG. 14B is a perspective view of just the trigger style actuating member.

Referring to FIGS. 14A and 14B, the trigger style actuating member 120 also includes an opening 123 that receives a mounting post or boss 124 projecting outwardly from an interior wall 125 of the housing 112. Thus, the actuating member 120 is rotationally mounted on the post 124. The actuating member 120 also includes a groove 126 with an enlarged portion 128 within which the head portion 60 of the cable 56 is captured. Thus, as the actuating member 120 is rotated from the locked position shown in FIG. 14A to its unlocked position, the end 58 of the cable 56 is wound onto the grove 126, thus effectively shortening the overall length of the cable.

Figure 16:
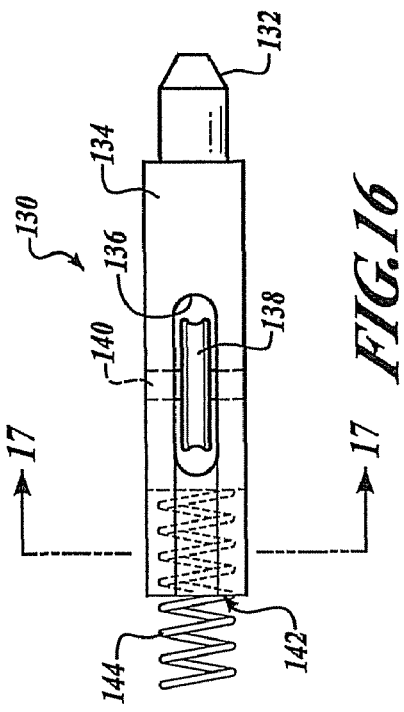
FIG. 16 is an enlarged side view of just the locking pin, the pulley wheel and the biasing spring shown in FIG. 15, assembled together.
Figure 17:
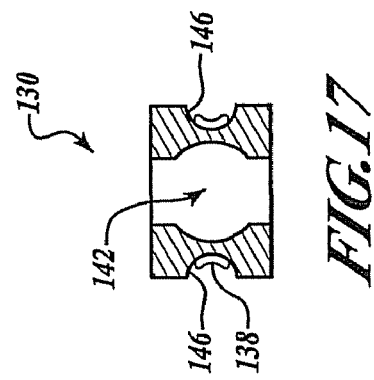
FIG. 17 is a cross-sectional end view of the biasing spring and locking pin taken in accordance with section line 17-17 in FIG. 16.

With further reference to FIGS. 14-17, a locking pin 130, similar in construction to locking pin 50, is disposed within the housing 112. With specific reference to FIGS. 15-17, the locking pin 130 includes a head portion 132 and a body portion 134. An opening 136 is formed in the body portion 134 and a pulley wheel 138 is mounted for rotational movement via a pin 140 within the opening 136. Referring to FIGS. 16 and 17, a second opening 142 is formed in the body portion 134 that receives an end of a biasing spring 144. In FIG. 17 the locking pin 130 can also be seen to include a pair of semi-circular relief portions 146 that provide clearance for the cable 56 when the cable is entrained about the pulley wheel 138.

Figure 15:
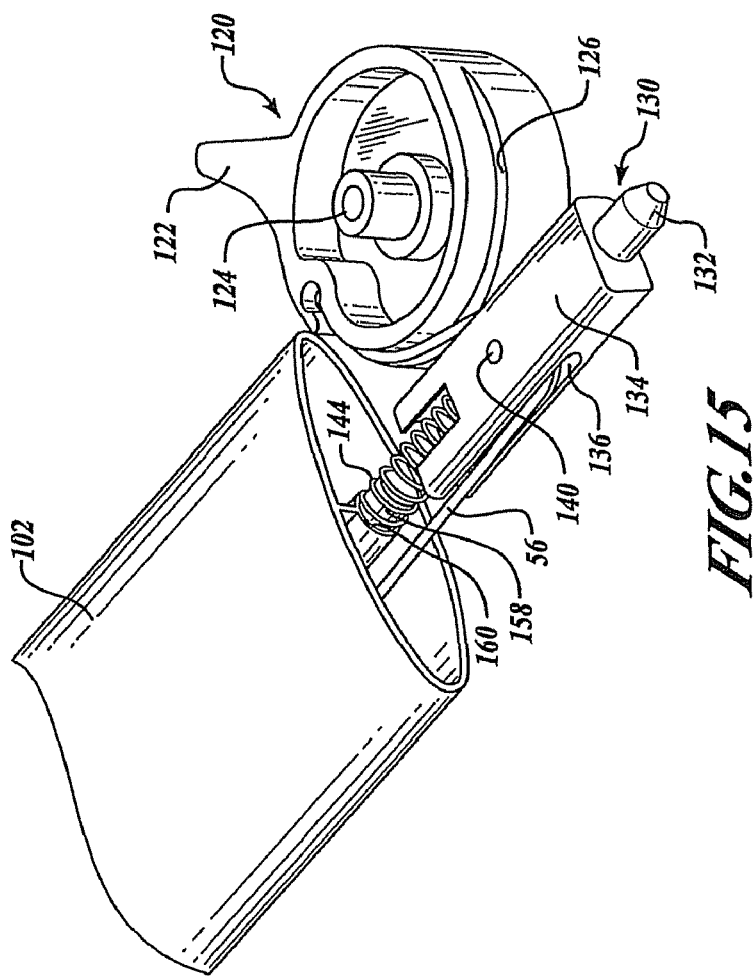
FIG. 15 is a bottom perspective, partial cutaway view of a portion of the first end support assembly illustrating the trigger style actuating member and a locking pin used in the end support assembled together with a portion of the cable coupled to the actuating member.

Referring further to FIG. 14A, the locking pin 130 is slidably positioned within a channel formed by a pair of upstanding wall portions 148 and an opening 150 in the housing 112. The housing 112 also includes a pair of support feet 152 that each have a wheel 154 rotationally mounted thereon via a threaded fastening element 156. Referring specifically to FIG. 15, an end of the coil spring 144 is position over a post 158 that is either threadably screwed into, or press fit into, a bore 160 formed internally to the crossbar component 102. An outer edge of the bore 160 serves as a surface against which the coil spring 144 may abut so that the coil spring biases the locking pin 130 into a locked position when the actuating member 120 is in its locked position.

Figure 18:
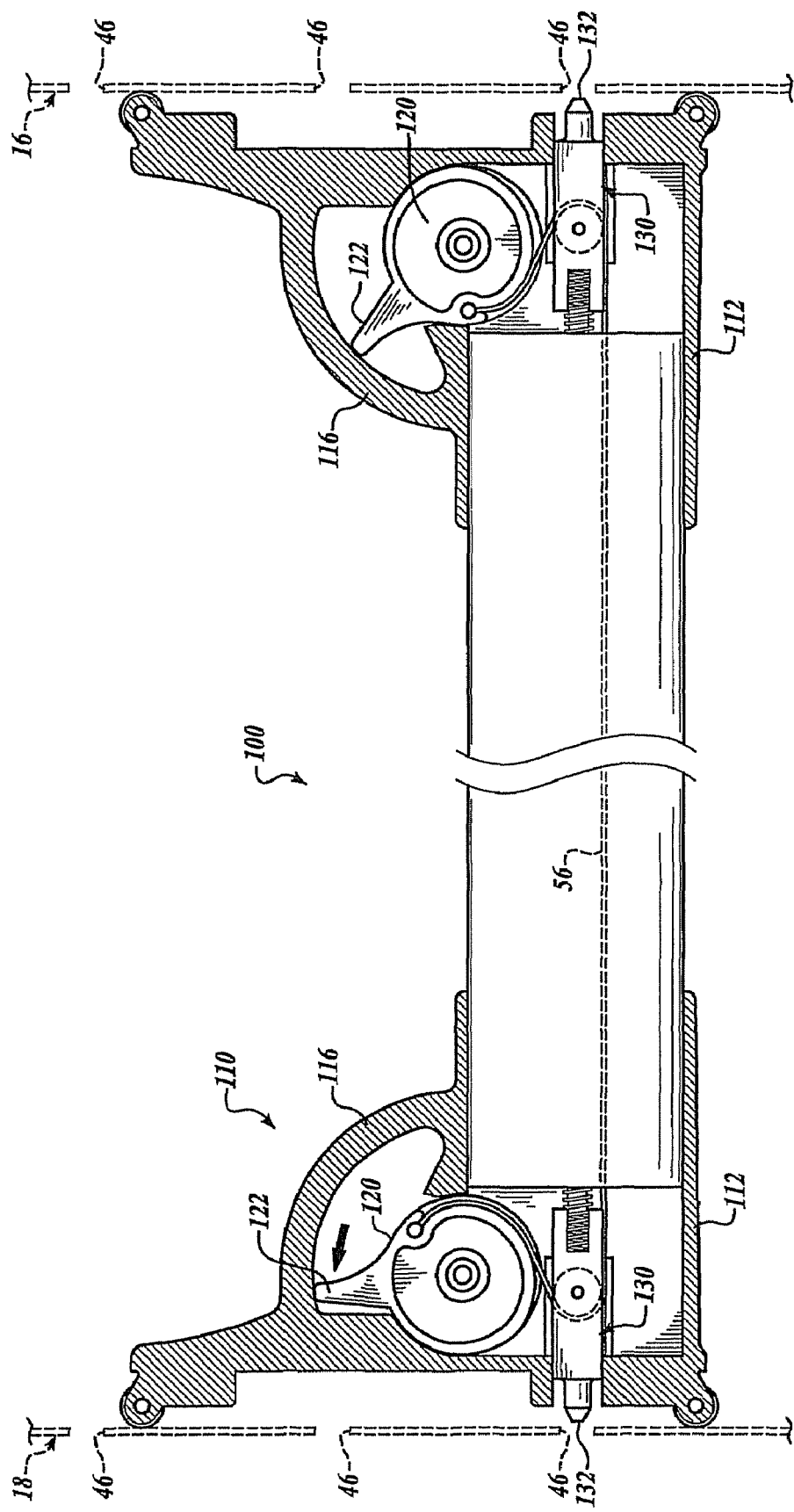
FIG. 18 is a bottom, partial fragmentary view of the assembly shown in FIG. 14A but with the actuating member on the second end support (left side of the Figure) having been moved into the unlocked position, which causes the locking pins of both end supports to be retracted into their unlocked positions.
Figure 19:
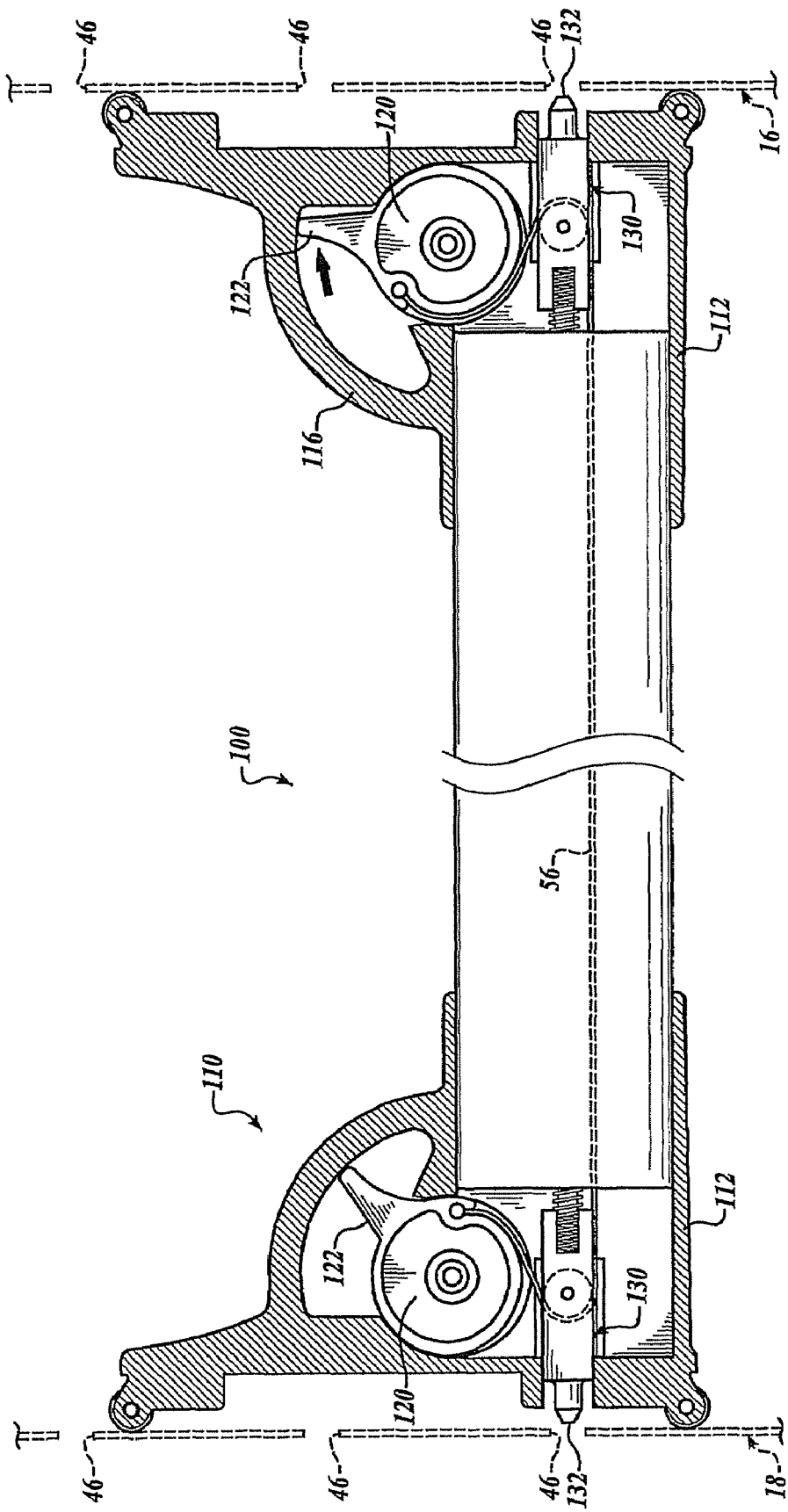
FIG. 19 shows the assembly of FIG. 18 but with the first end support (right hand side of the Figure) having its actuating member moved into the retracted position, thus retracting the locking pins of both end supports into their unlocked positions.

Referring now to FIGS. 14A, 18 and 19, the operation of the crossbar assembly 100 will be described. When the user is not engaging either of the actuating members 120, the actuating members will assume the positions shown in FIG. 14A. The coil springs 144 operate to bias the locking pins 130 outwardly into their respective holes 46 in the support rails 16 and 18. Referring to FIG. 18, when the user engages the actuating member 120 of the second end support 110 with a finger and urges it into the unlocked position, this causes the effective length of the cable 56 to be shortened. The shortening of the effective length of the cable 56 in turn causes both of the locking pins 130 to be virtually simultaneously retracted from the holes 46 in their respective support rails 16 and 18, against the biasing forces of the coil springs 144. While the actuating member 120 of the second end support 110 is held in the position shown in FIG. 18, the entire crossbar assembly 100 may be moved along the support rails 16 and 18 to a new position. Wheels 154 help to prevent binding or crabbing of the end supports 108 and 110 and ensure smooth movement along the support rails 16 and 18.

As soon as the user releases the actuating member 120 of the second end support 110, the coil springs 144 immediately urge the locking pins 130 back into their extended (i.e., locked) positions. FIG. 19 illustrates the same operation but with the actuating member 120 of the first end support 108 having been moved into its unlocked position. The same operation occurs; the effective length of the cable 56 is shortened, thus causing the locking pins 130 to be virtually simultaneously retracted. Releasing actuating member 120 of the first end support 108 allows the coil springs 144 to bias the locking pins 130 outwardly into engagement with an aligned pair of holes 46.

The system and method of the present disclosure thus enables a vehicle article carrier system and method to be formed in which the locking pin at each end of the crossbar assembly can be simultaneously moved between locked and unlocked positions from one side of the crossbar assembly. This adds significant utility to the use of the crossbar assembly and eliminates the need for the user to walk back and forth between both sides of the vehicle 12 when the crossbar assembly needs to be repositioned along the support rails 16 and 18.

The various embodiments described herein also provide for low-profile construction end support assemblies that are aerodynamically efficient and aerodynamically efficient. The end supports are also robust in construction and can be manufactured with a minimal number of independent component parts. From a manufacturing standpoint, assembly of the end supports can be accomplished in a relatively short time.

An additional advantage is that when either actuating component (i.e., either of components 42 or components 120) is released by the user, both of the end supports (26,30 and 108,110) are automatically urged, virtually simultaneously, into locking engagement with their respective support rail 16 or 18. Thus, there is no chance of one of the end supports inadvertently being left in an unlocked orientation by the user.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier apparatus for supporting articles elevationally above an outer body surface of a vehicle, the apparatus comprising:

a pair of support rails adapted to be fixedly secured to said outer body surface generally parallel to one another;

a cross bar assembly having a length sufficient to span between the support rails and adapted to engage and to be supported from the support rails, for supporting articles thereon;

said cross bar assembly including:

a cross bar component having first and second opposing ends;

a first end support secured at said first end;

a second end support secured to said second end;

an elongated element extending between said end supports;

each of said end supports including an actuating member moveable between a locked position and an unlocked position;

each of said end supports including a locking member operably associated therewith which is moveable slidably and linearly between an extended position and a retracted position;

each said locking member including a rotationally mounted pulley wheel around which a portion of said elongated element is entrained, and a biasing element for biasing its associated said locking member into said extended position; said biasing element and said pulley wheel of each said locking member being supported so as to be longitudinally aligned with a longitudinal axis of said locking member, and said pulley wheel being moveable linearly along said longitudinal axis when its associated said locking member is moved between said extended and retracted positions;

each said actuating member being coupled to an associated end of said elongated element, with said elongated element being entrained about both of said pulley wheels; and movement of either of said actuating members into said unlocked position being adapted to cause a generally simultaneous movement of both of said locking members into said unlocked position, against biasing forces of said biasing elements.

2. The apparatus of claim 1, wherein movement of either of said actuating members from said locked position to said unlocked position causes both of said locking members to be generally simultaneously moved into extended positions by biasing forces of said biasing elements.

3. The apparatus of claim 1, wherein said actuating member comprises a pivotally supported actuating lever.

4. The apparatus of claim 1, wherein said actuating member comprises a rotationally mounted, trigger style actuating member having a trigger portion adapted to be engaged by one or more fingers of a user.

5. The apparatus of claim 1, wherein said locking member comprises:
    a head portion adapted to engage with a portion of an associated one of said support rails;
    a portion having an opening formed therein;
    said pulley wheel being rotationally supported within said opening.

6. The apparatus of claim 5, wherein said locking member includes a base portion over which a portion of an associated one of said biasing elements is positioned.

7. The apparatus of claim 5, wherein said locking member includes an additional opening within which a portion of an associated one of said biasing elements is positioned to retain said associated biasing element to said locking member.

8. The apparatus of claim 4, wherein said trigger style actuating member includes a groove around which a portion of said elongated element can be wound on as said trigger style actuating member is moved from said locked position to said unlocked position.

9. The apparatus of claim 1, wherein each said end support includes a housing having a trigger guard portion forming an opening; and
    wherein said actuating member forms a trigger style actuating member mounted for rotational movement within said housing, and having a trigger portion projecting into said opening.

10. The apparatus of claim 1, wherein each said support rail includes a plurality of longitudinally spaced apart holes formed in a wall portion thereof; and
    wherein each said locking member includes a head portion adapted to engage with an aligned one of said holes in its associated said support rail, to thus positively lock its associated end support against longitudinal movement on its associated said support rail.

11. The apparatus of claim 1, wherein said elongated element includes a cable.

12. A vehicle article carrier apparatus for supporting articles elevationally above an outer body surface of a vehicle, the apparatus comprising:
    a pair of support rails adapted to be fixedly secured to said outer body surface generally parallel to one another;
    a cross bar assembly having a length sufficient to span between the support rails and adapted to engage and to be supported from the support rails, for supporting articles thereon;
    said cross bar assembly including:
        a cross bar component having first and second opposing ends;
        a first end support secured at said first end;
        a second end support secured to said second end;
        a cable extending between said end supports;
        each of said end supports including an actuating member moveable between a locked position and an unlocked position;
        each of said end supports including a locking member operably associated therewith which is moveable slidably linearly between an extended position and a retracted position;
        each said locking member including a rotationally mounted pulley wheel around which a portion of said cable is entrained, and a biasing element for biasing its associated said locking member into said extended position, said pulley wheel adapted to move linearly with movement of said locking member;
        each said actuating member being coupled to an associated end of said cable, with said cable being entrained about both of said pulley wheels; and
        movement of either of said actuating members from said locked position into said unlocked position being adapted to cause an effective shortening of said cable that causes said cable to draw said pulley wheels linearly toward one another, thus shortening a longitudinal distance between said pulley wheels, and to generally simultaneously move both of said locking members into said unlocked position against biasing forces of said biasing elements; and
    movement of either of said actuating member from its unlocked position into its locked position being adapted to cause an effective lengthening of said cable that enables said biasing elements to urge said locking members into their extended positions generally simultaneously.

13. The apparatus of claim 12, wherein said cable extends through an interior area of said cross bar component.

14. The apparatus of claim 12, wherein said actuating member comprises a rotationally mounted trigger style actuating member having a trigger portion engageable with a finger of a user; and
    wherein said trigger style actuating member is supported in a plane generally parallel to said outer body surface when said cross bar assembly is secured to said support rails.

15. The apparatus of claim 12, wherein said actuating member comprises a pivotally mounted component disposed for movement within a plane perpendicular to said outer body surface.

16. A vehicle article carrier apparatus for supporting articles elevationally above an outer body surface of a vehicle, the apparatus comprising:
   a pair of support rails adapted to be fixedly secured to said outer body surface generally parallel to one another;
   a cross bar assembly having a length sufficient to span between the support rails and adapted to engage and to be supported from the support rails, for supporting articles thereon;
   said cross bar assembly including:
      a cross bar component having first and second opposing ends;
      a first end support secured at said first end;
      a second end support secured to said second end;
      a cable extending between said end supports;
      each of said end supports including an actuating member moveable between a locked position and an unlocked position;
      each of said end supports including a locking member operably associated therewith which is moveable slidably linearly between an extended position and a retracted position;
      each said locking member including an opening having a rotationally mounted pulley wheel around which a portion of said cable is entrained;
      each said locking member including a coil spring operably associated therewith;
      each said locking member further including a structural portion for capturing a first end of its associated said coil spring and holding said associated coil spring aligned with said locking member;
      each end of said first and second opposing ends of said cross bar including a portion for supporting a second end of said coil spring to maintain said coil spring longitudinally aligned with said locking member;
      each said actuating member being coupled to an end of said cable, with said cable being entrained about both of said pulley wheels;
      each said support rail having a plurality of spaced apart holes in a wall portion thereof, with specific ones of said holes in said support rails being laterally aligned with one another to thus form a plurality of pairs of associated holes, with each said pair defining a specific longitudinal location along said support rails at which said cross bar assembly can be fixedly secured;
      movement of either of said actuating members into said unlocked position adapted to cause an effective shortening of said cable that causes said cable to draw said pulley wheels toward one another, to generally simultaneously move both of said locking members into said unlocked position against biasing forces of said biasing elements; and
      movement of either of said actuating member from its unlocked position into its locked position, adapted to cause an effective lengthening of said cable that enables said biasing elements to urge said locking members into their extended positions generally simultaneously.

17. The apparatus of claim 16, wherein said actuating member comprises a trigger style actuating member that is mounted for rotational movement within a plane generally parallel to said outer body surface of said vehicle.

18. The apparatus of claim 17, wherein a portion of said cable is wound upon said trigger style actuating member when said trigger style actuating member is moved into said unlocked position.

19. The apparatus of claim 16, wherein said actuating member comprises a lever style actuating member that is mounted for pivotal movement with a plane generally perpendicular to said outer body surface of said vehicle.

20. A vehicle article carrier apparatus for supporting articles elevationally above an outer body surface of a vehicle, the apparatus comprising:
   a pair of support rails adapted to be fixedly secured to said outer body surface generally parallel to one another;
   a cross bar assembly having a length sufficient to span between the support rails and adapted to engage and to be supported from the support rails, for supporting articles thereon;
   said cross bar assembly including:
      a cross bar component having first and second opposing ends;
      a first end support secured at said first end;
      a second end support secured to said second end;
      an elongated element extending between said end supports;
      each of said end supports including an actuating member moveable between a locked position and an unlocked position;
      each of said end supports including a locking member operably associated therewith which is moveable between an extended position and a retracted position;
      each said locking member including:
         a rotationally mounted pulley wheel around which a portion of said elongated element is entrained;
         a biasing element for biasing its associated said locking member into said extended position;
         a head portion adapted to engage with a portion of an associated one of said support rails;
         a base portion over which a portion of an associated one of said biasing elements is positioned;
         a mid-portion having an opening formed therein, said pulley wheel being rotationally supported within said opening;
      each said actuating member being coupled to an associated one of said elongated element, with said elongated element being entrained about both of said pulley wheels; and
      movement of either of said actuating members into said unlocked position being adapted to cause a generally simultaneously movement of both of said locking members into said unlocked position, against biasing forces of said biasing elements.

* * * * *